(12) United States Patent
Chikura et al.

(10) Patent No.: US 9,914,077 B2
(45) Date of Patent: Mar. 13, 2018

(54) END MEMBER FOR SPIRAL SEPARATION MEMBRANE ELEMENT, SPIRAL SEPARATION MEMBRANE ELEMENT AND SEPARATION MEMBRANE MODULE

(75) Inventors: Shinichi Chikura, Osaka (JP); Yasuhiro Uda, Osaka (JP); Toshimitsu Hamada, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 745 days.

(21) Appl. No.: 14/237,134

(22) PCT Filed: Aug. 10, 2012

(86) PCT No.: PCT/JP2012/005111
§ 371 (c)(1),
(2), (4) Date: Feb. 4, 2014

(87) PCT Pub. No.: WO2013/021658
PCT Pub. Date: Feb. 14, 2013

(65) Prior Publication Data
US 2014/0183126 A1    Jul. 3, 2014

(30) Foreign Application Priority Data

Aug. 11, 2011    (JP) .................................. 2011-175576

(51) Int. Cl.
*B01D 63/10* (2006.01)
*B01D 29/13* (2006.01)
*B01D 63/12* (2006.01)

(52) U.S. Cl.
CPC ........... *B01D 29/13* (2013.01); *B01D 63/106* (2013.01); *B01D 63/12* (2013.01);
(Continued)

(58) Field of Classification Search
CPC .......... B01D 2313/08; B01D 2313/086; B01D 2313/10; B01D 2313/105; B01D 2313/19;
(Continued)

(56) References Cited

U.S. PATENT DOCUMENTS 4,498,786 A * 2/1985 Ruscheweyh ......... B01F 5/0268
137/896
5,128,037 A * 7/1992 Pearl ...................... B01D 61/10
210/321.74
(Continued)

FOREIGN PATENT DOCUMENTS

JP      4-330921      11/1992
JP      2004-536703   12/2004
(Continued)

OTHER PUBLICATIONS

English language machine translation of JP2009-220070, No Date, 17 Pages.*
(Continued)

*Primary Examiner* — Pranav Patel
(74) *Attorney, Agent, or Firm* — Hamre, Schumann, Mueller & Larson, P.C.

(57) ABSTRACT

An end member (3A) for a spiral separation membrane element includes: an inner annular portion (31); an outer annular portion (32) surrounding the inner annular portion (31) at a distance from the inner annular portion (31); a plurality of connecting portions (33) connecting the inner annular portion (31) and the outer annular portion (32); and a shield plate (34) disposed between at least one pair of the connecting portions (33) and forming an opening (41) between the shield plate (34) and the outer annular portion (32). According to this configuration, a radially outwardly spreading flow is formed by the shield plate (34), and
(Continued)

therefore suspended solids in a feed liquid can be effectively directed to the peripheral region.

19 Claims, 10 Drawing Sheets

(52) U.S. Cl.
CPC .. *B01D 2201/291* (2013.01); *B01D 2201/293* (2013.01); *B01D 2313/08* (2013.01); *B01D 2313/10* (2013.01); *B01D 2313/13* (2013.01); *B01D 2313/21* (2013.01)

(58) Field of Classification Search
CPC  B01D 2313/21; B01D 2313/13; B01D 63/10; B01D 63/106; B01F 5/0618; B01F 5/0606; B01F 5/061; B01F 2009/0078; B01F 7/00908

See application file for complete search history.

(56) References Cited

U.S. PATENT DOCUMENTS

| | | | | |
|---|---|---|---|---|
| 6,632,356 | B2* | 10/2003 | Hallan | B01D 63/106 210/321.6 |
| 6,946,011 | B2* | 9/2005 | Snyder | B01D 53/508 137/896 |
| 7,172,697 | B2 | 2/2007 | Chikura et al. | |
| 7,387,731 | B2 | 6/2008 | Colby et al. | |
| 2003/0007419 | A1* | 1/2003 | Goebel | B01F 5/064 366/336 |
| 2003/0192821 | A1 | 10/2003 | Almasian et al. | |
| 2009/0095670 | A1 | 4/2009 | Uda et al. | |
| 2009/0266064 | A1* | 10/2009 | Zheng | B01F 3/04049 60/317 |
| 2009/0314713 | A1 | 12/2009 | Shelby et al. | |

FOREIGN PATENT DOCUMENTS

| | | |
|---|---|---|
| JP | 2005-111473 | 4/2005 |
| JP | 2007-326065 | 12/2007 |
| JP | 2009/136777 | 6/2009 |
| JP | 2009-154159 | 7/2009 |
| JP | 2009-189947 | 8/2009 |
| JP | 2009-220070 | 10/2009 |
| JP | 2010-042374 | 2/2010 |

OTHER PUBLICATIONS

English language machine translation of JP2010-042374, No Date, 10 Pages.*

* cited by examiner

END MEMBER FOR SPIRAL SEPARATION MEMBRANE ELEMENT, SPIRAL SEPARATION MEMBRANE ELEMENT AND SEPARATION MEMBRANE MODULE

TECHNICAL FIELD

The present invention relates to an end member for a spiral separation membrane element. The present invention also relates to a spiral separation membrane element using this end member and a separation membrane module including this spiral separation membrane element.

BACKGROUND ART

Spiral separation membrane elements used for, for example, seawater desalination and ultrapure water production, are conventionally known (see, for example, Patent Literature 1). Generally, in a spiral separation membrane element, a layered body including a separation membrane is wound around a central tube, and end members are disposed on both sides of the layered body. The end members serve, for example, to prevent the layered body from extending telescopically.

A feed liquid fed to the spiral separation membrane element passes through one of the end members and then is separated into a permeate liquid and a concentrated liquid by the separation membrane. The permeate liquid is discharged through the central tube, and the concentrated liquid is discharged through the other end member.

The end members have a configuration in which an inner annular portion and an outer annular portion are connected together by a plurality of ribs. The use of twisted shape ribs in these end members have been proposed to form a swirling flow in the feed liquid (see, for example, Patent Literature 2).

CITATION LIST

Patent Literature

Patent Literature 1: JP 2005-111473 A
Patent Literature 2: JP 2009-220070 A

SUMMARY OF INVENTION

Technical Problem

Since the feed liquid sometimes contains suspended solids, these suspended solids may be deposited in the form of scale or biofilm on the separation membrane. The present inventors have found that this phenomenon occurs more frequently in the central region than in the peripheral region. On the other hand, if a swirling flow is formed as described above, it is possible to direct the suspended solids to the peripheral region, and thereby prevent the deposition of the suspended solids from being concentrated in a specific region.

It is an object of the present invention to provide a novel end member for a spiral separation membrane element capable of preventing deposition of suspended solids from being concentrated in a specific region. It is another object of the present invention to provide a spiral separation membrane element using this end member and a separation membrane module including this spiral separation membrane element.

Solution to Problem

In order to solve the above problem, the present invention provides an end member for a spiral separation membrane element, the end member including: an inner annular portion; an outer annular portion surrounding the inner annular portion at a distance from the inner annular portion; a plurality of connecting portions connecting the inner annular portion and the outer annular portion; and a shield plate disposed between at least one pair of the connecting portions and forming an opening between the shield plate and the outer annular portion.

The present invention also provides a spiral separation membrane element including at least one end member described above.

The present invention further provides a separation membrane module including: a tubular pressure container; and the spiral separation membrane element described above, the spiral separation membrane element being loaded in the pressure container.

Advantageous Effects of Invention

According to the above-described configuration, a radially outwardly spreading flow is formed by the shield plate, and therefore suspended solids in a feed liquid can be effectively directed to the peripheral region. Thereby, the deposition of the suspended solids can be prevented from being concentrated in a specific region.

DESCRIPTION OF EMBODIMENTS

Hereinafter, embodiments of the present invention will be described with reference to the drawings. The following description relates to examples of the present invention, and the present invention is not limited to the examples.

First Embodiment

Figure 1:
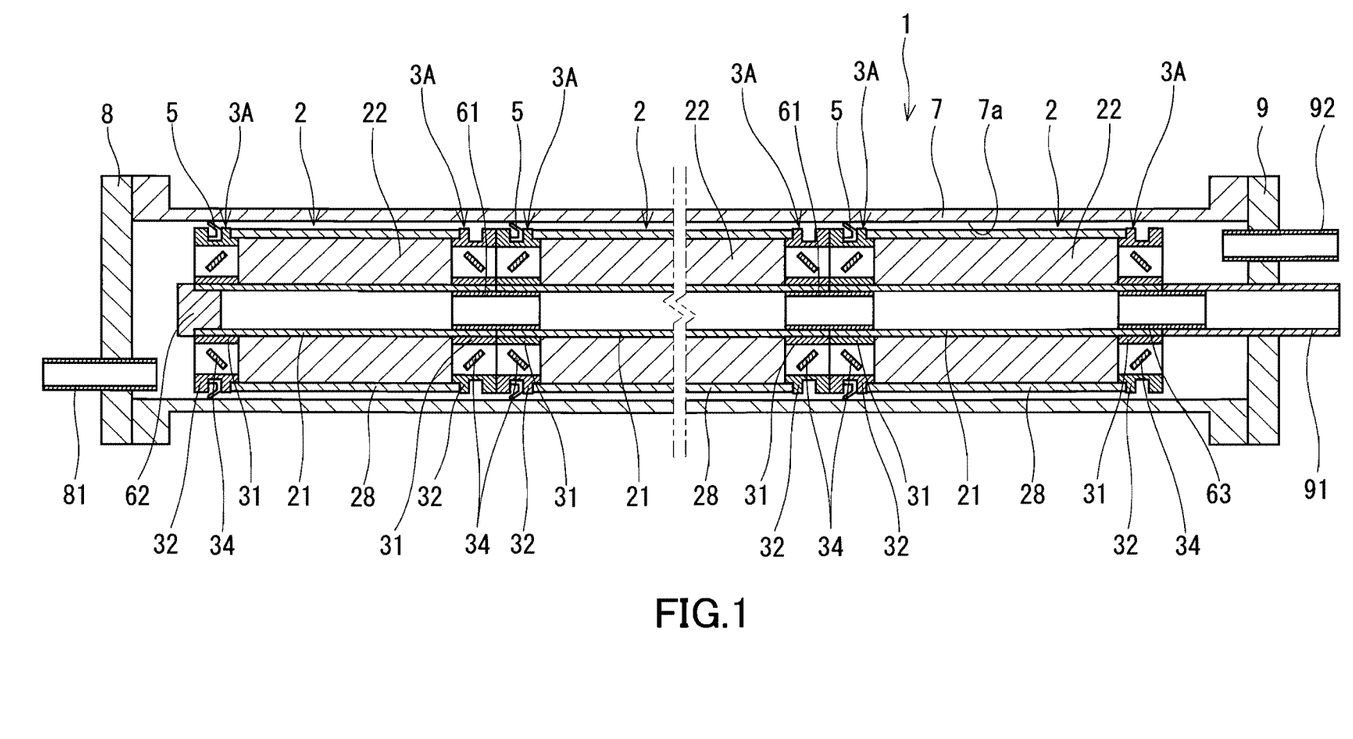
FIG. 1 is a cross-sectional view of a separation membrane module including spiral separation membrane elements using end members for spiral separation membrane elements according to a first embodiment of the present invention.

FIG. 1 shows a separation membrane module 1 including spiral separation membrane elements 2 using end members 3A for spiral separation membrane elements according to the first embodiment of the present invention. This separation membrane module 1 includes a tubular pressure container 7 called a vessel and a plurality of separation membrane elements 2 loaded in the pressure container 7. The adjacent separation membrane elements 2 are coupled together by couplers 61 so as to form a continuous flow path through central tubes 21 described later.

Disc-shaped caps 8 and 9 are attached to both ends of the pressure container 7. In the cap 8 on one side (left side in FIG. 1), a feed tube 81 for feeding a raw liquid into the pressure container 7 is provided apart from the center of the cap 8. In the cap 9 on the other side (right side in FIG. 1), a first discharge tube 91 for drawing a permeate liquid extracted from the raw liquid is provided at the center of the cap 9, and a second discharge tube 92 for drawing the concentrated raw liquid is provided apart from the center. That is, a flow of the raw liquid from the cap 8 on one side to the cap 9 on the other side is formed in the pressure container 7. The feed tube 81 and the second discharge tube 92 may be provided in the pressure container 7.

In each of the separation membrane elements 2, the feed liquid is separated into a permeate liquid and a concentrated liquid. The raw liquid is fed as a feed liquid to the separation membrane element 2 located at the most upstream position, and the concentrated liquid discharged from the upstream-side separation membrane element 2 is fed as a feed liquid to the remaining separation membrane elements 2.

Each of the separation membrane elements 2 has a central tube 21 serving as a water collecting tube, a layered body 22 wound around the central tube 21, and an outer covering material 28 covering the layered body 22. The end members 3A of the present embodiment are disposed on both sides of the layered body 22 so as to sandwich the layered body 22. The end members 3A serve to prevent the layered body 22 from extending telescopically and serve to support the outer covering material 28. A plug 62 is attached to the central tube 21 of the separation membrane element 2 located at the most upstream position, and the central tube 21 of the separation membrane element 2 located at the most downstream position is coupled to the first discharge tube 91 by a coupler 63.

In the present embodiment, a sealing member 5 is attached to the upstream-side one of the end members 3A disposed on both sides of the layered body 22, and the sealing member 5 is a packing having an approximately U-shaped cross-section and configured to seal a gap between the separation membrane element 2 and the inner peripheral face 7a of the pressure container 7 by means of a pressure applied by the raw liquid from the upstream side. The sealing member 5 may be attached to the downstream-side end member 3A instead of the upstream-side end member 3A.

Figure 2A:
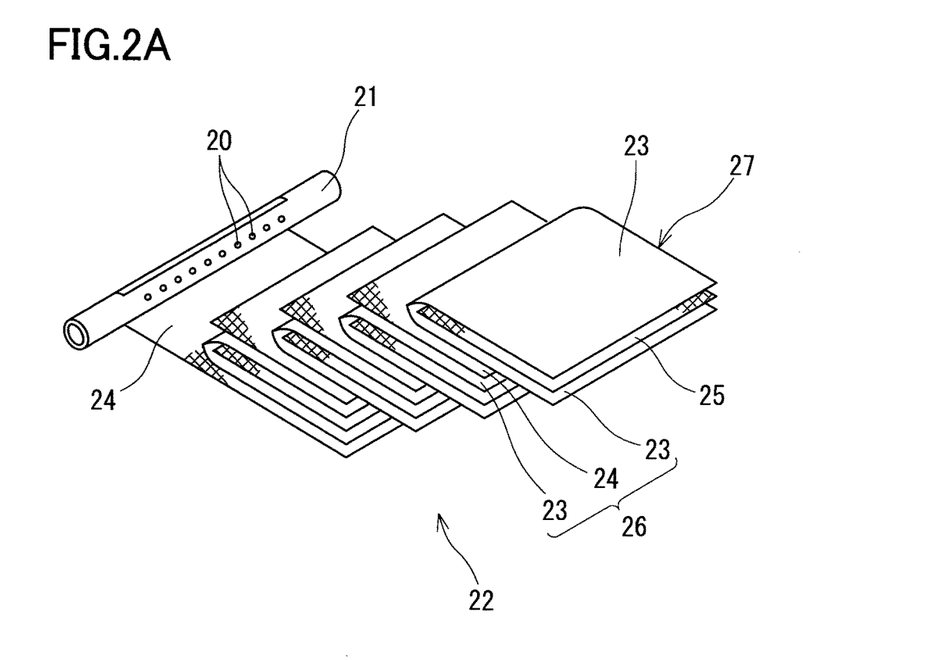
FIG. 2A is a perspective view of a layered body which has not yet been wound around a central tube.
Figure 2B:
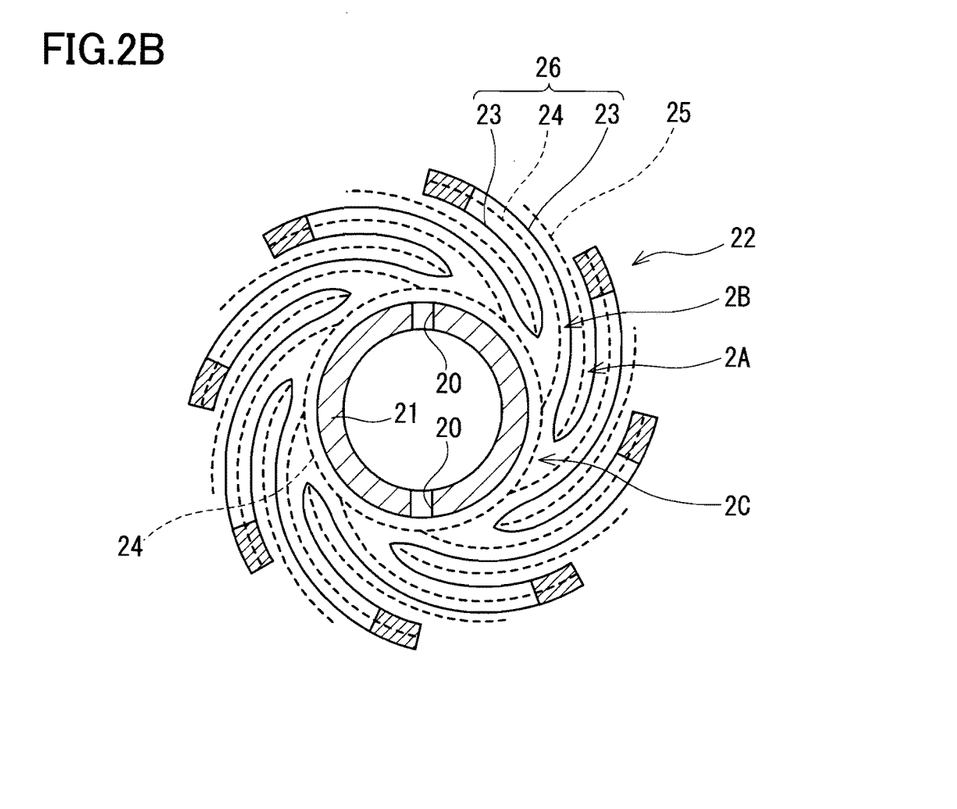
FIG. 2B is a schematic cross-sectional view of the layered body which has been wound around the central tube.

As shown in FIG. 2A and FIG. 2B, the central tube 21 of each separation membrane element 2 is provided with a plurality of through holes 20 for allowing the permeate liquid to flow into the central tube 21. The layered body 22 has a configuration in which envelope-like membrane leaves 26, each of which is composed of a permeate-side flow path material 24 and separation membranes 23 placed on both sides of the permeate-side flow path material 24, and feed-side flow path materials 25 are alternately stacked. The permeate-side flow path material 24 is, for example, a net made of a resin, and forms a permeate-side flow path 2B for allowing the permeate liquid to flow between the separation membranes 23. The feed-side flow path material 25 is, for example, a net made of a resin (a net whose meshes are larger than those of the permeate-side flow path material 24), and forms a feed-side flow path 2A for allowing the feed liquid to flow between the membrane leaves 26.

For example, two separation membranes 23 are formed by folding a single continuous sheet 27 into two with the feed-side flow path material 25 sandwiched therebetween. The separation membranes 23 thus formed are joined together along three sides thereof with the permeate-side flow path material 24 sandwiched therebetween. Thus, the membrane leaf 26 is obtained. An adhesive is used for this joining. For example, one of the permeate-side flow path materials 24 is elongated, the elongated portion is directly wound around the central tube 21, and both ends of the elongated portion are sealed with an adhesive. Thus, a tubular flow path 2C is formed along the outer peripheral face of the central tube 21. The openings of the membrane leaves 26 communicate with the through holes 20 through this tubular flow path 2C.

The configuration of the layered body 22 is not limited to that shown in FIG. 2A and FIG. 2B. For example, all the separation membranes 23 may be connected into a single accordion-folded continuous sheet.

Examples of the separation membrane 23 includes reverse osmosis membranes (RO membranes), ultrafiltration membranes (UF membranes), microfiltration membranes (MF membranes), nanofiltration membranes (NF membranes), forward osmosis membranes, and gas separation membranes for use for the PV method and the VP method. As a reverse osmosis membrane, for example, a composite membrane composed of a porous support and a polyamide polymer skin layer provided thereon can be used.

The porous support is not particularly limited as long as a skin layer can be formed on the support. A porous support composed of a base material such as a nonwoven fabric or a woven fabric and a microporous polysulfone layer provided thereon is used preferably. Porous membranes made of polyimide, polyvinylidene fluoride, epoxy, etc. also can be used alone.

The skin layer can be formed by a known method. For example, it is possible to form an aqueous solution coating layer containing a polyfunctional amine component on a porous support and bring this coating layer into contact with a solution containing a polyfunctional acid halide component. Examples of the polyfunctional amine component include aromatic, aliphatic, or alicyclic polyfunctional amines. These polyfunctional amine components may be used alone or as a mixture thereof. An aromatic, aliphatic, or alicyclic polyfunctional acid halide can be used as the polyfunctional acid halide component. These polyfunctional acid halide components may be used alone, but they may be used as a mixture thereof.

Figure 3:
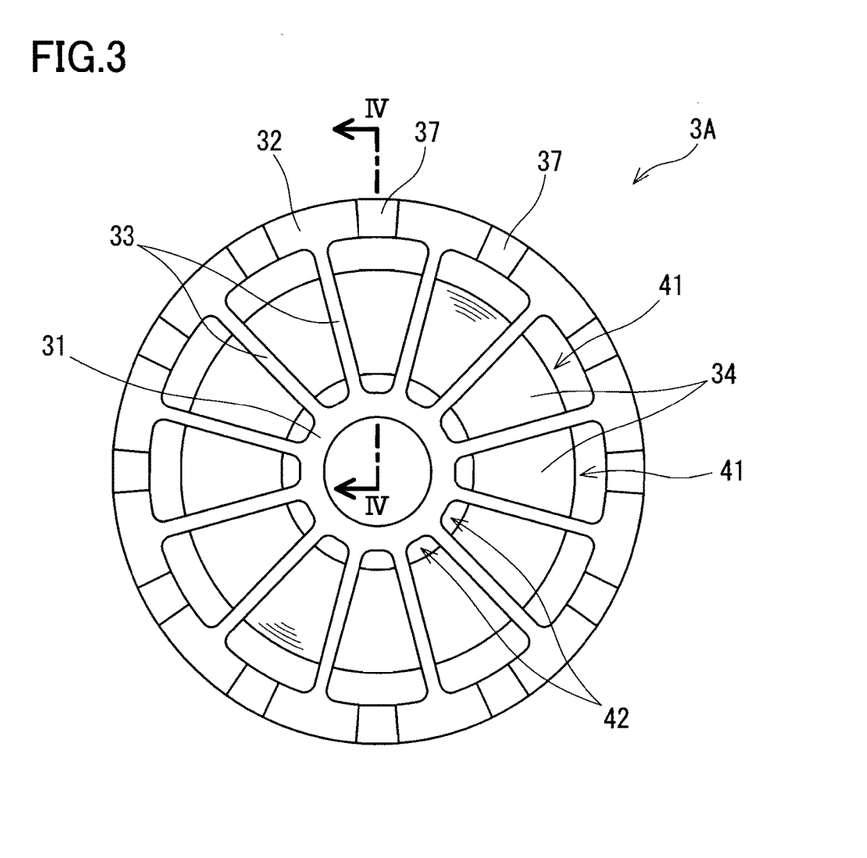
FIG. 3 is a front view of the end member for a spiral separation membrane element according to the first embodiment.
Figure 4:
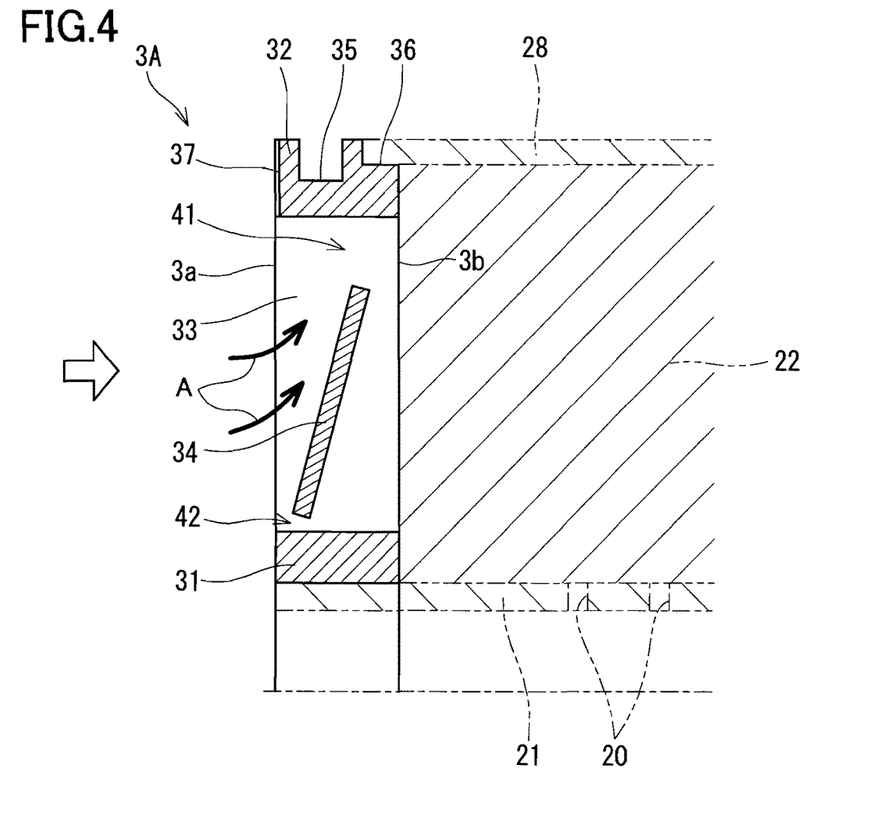
FIG. 4 is a cross-sectional view of the end member taken along the IV-IV line in FIG. 3, and is also a diagram illustrating the flow of a feed liquid passing through the end member.

Next, the end member 3A is described in detail with reference to FIG. 3 and FIG. 4.

The end member 3A is a disc-shaped member as a whole and is flat in the axial direction of the separation membrane element 2. The end member 3A has a first end face 3a forming the end face of the separation membrane element 2 and a second end face 3b facing in the opposite direction to the first end face 3a (facing the layered body 22). In the present embodiment, the end member 3A is fixed to the central tube 21 so that the first end face 3a coincides with the end face of the central tube 21, and therefore, when the separation membrane elements 2 are coupled together, the first end faces 3a of the end members 3A of the separation membrane elements 2 come into close contact with each other. Hereinafter, for convenience of description, the side of the first end face 3a and the side of the second end face 3b are referred to as a front side and a rear side, respectively, with respect to the center in the thickness direction of the end member 3A. The thickness direction of the end member 3A is also referred to simply as an axial direction.

The end members 3A can each be obtained by, for example, injection molding of a resin. The resin used is not particularly limited. Various resins such as Noryl (modified PPE), PA, PE, and PP can be used. However, it is preferable to use ABS resins in terms of economy, chemical resistance, and mechanical strength.

Specifically, each of the end members 3A has a tubular inner annular portion 31 fitted on the outer side of the end portion of the central tube 21, and has a tubular outer annular portion 32 disposed concentrically with the inner annular portion 31 and surrounding the inner annular portion 31 at a distance from the inner annular portion 31. The inner annular portion 31 and the outer annular portion 32 are connected together, for example, by a plurality of connecting portions 33 that are arranged at regular angular intervals.

In the present embodiment, the inner annular portion 31 and the outer annular portion 32 have the same thickness, and each of the connecting portions 33 is formed of a plate-shaped rib having a width equal to that thickness. That is, the front-side end face of the inner annular portion 31, the front-side end face of the outer annular portion 32, and the front-side side faces of the connecting portions 33 form the continuous first end face 3a, and the rear-side end face of the inner annular portion 31, the rear-side end face of the outer annular portion 32, and the rear-side side faces of the connecting portions 33 form the continuous second end face 3b. However, the first end face 3a and the second end face 3b need not necessarily be continuous faces. For example, the width of the ribs constituting the connecting portions 33 may be shorter than the thickness of the inner annular portion 31 and the outer annular portion 32 so that an intermediate region between the inner annular portion 31 and the outer annular portion 32 on the first end face 3a and/or the second end face 3b is recessed from the inner peripheral portion and the outer peripheral portion.

The entire outer peripheral face of the outer annular portion 32 has formed therein an annular groove 35 for holding the sealing member 5 and opening radially outwardly. A corner portion between the outer peripheral face and the rear-side end face of the outer annular portion 32 has formed therein a stepped portion 36 for supporting the outer covering material 28. Furthermore, the front-side end face of the outer annular portion 32 has a groove 37 formed therein. When the separation membrane elements 2 are coupled together, the grooves 37 of the end members 3A of these separation membrane elements 2 form a flow path therebetween so as to direct the raw liquid around the separation membrane elements 2.

In the present embodiment, each rib constituting the connecting portion 33 extends linearly and radially. That is, the connecting portions 33 are arranged in a radial pattern. The spaces between the connecting portions 33 serve as through openings that allow the feed liquid or the concentrated liquid to flow through the end member 3A. However, the ribs need not necessarily have a linear shape when viewed from the axial direction, and they may have a spirally curved shape. In addition, the connecting portions 33 are not limited to plate-shaped ribs. The connecting portions 33 may have any shape as long as their cross-sectional shape is suitable for the connection of the inner annular portion 31 and the outer annular portion 32 with sufficient strength, that is, as long as they have a sufficiently high axial moment of inertia of the cross section. For example, rod-like spokes can also be used as the connecting portions 33. In this case, the first end face 3a may consist only of the front-side end face of the inner annular portion 31 and the front-side end face of the outer annular portion 32. The second end face 3b may consist only of the rear-side end face of the inner annular portion 31 and the rear-side end face of the outer annular portion 32.

In the present embodiment, the shield plates 34 are arranged between all the connecting portions 33. The shield plates 34 are each in contact with the adjacent connecting portions 33 and extend radially. In other words, all the connecting portions 33 are connected by the shield plates 34 to form an annular array.

Each of the shield plates 34 is disposed at a distance from the inner annular portion 31 and the outer annular portion 32. That is, the shield plate 34 forms a first opening 41 with the outer annular portion 32 and a second opening 42 with the inner annular portion 31. The first opening 41 is formed by two adjacent connecting portions 33, the outer annular portion 32, and the outer edge of the shield plate 34 on the outer annular portion 32 side. The second opening 42 is formed by two adjacent connecting portions 33, the inner annular portion 31, and the outer edge of the shield plate 34 on the inner annular portion 31 side.

The shape and position of each shield plate 34 are not particularly limited as long as it extends radially. For example, each shield plate 34 may be configured to extend perpendicular to the axial direction. However, it is preferable that each shield plate 34 be configured so that the outer edge on the outer annular portion 32 side is located closer to the second end face 3b than the inner edge on the inner annular portion 31 side.

In the present embodiment, each shield plate 34 is a plate extending continuously from the inner edge to the outer edge at a fixed inclination angle toward the second end face 3b. The angle of inclination of the shield plate 34 is, for example, 5 to 6 degrees, and the thickness of the shield plate 34 is, for example, 3 mm. Each shield plate 34 need not necessarily be inclined at a fixed angle as long as it is inclined as a whole. For example, each shield plate 34 may be curved in such a manner that it has a convex surface facing the first end face 3a or the second end face 3b.

Preferably, the area of the first opening 41 is one tenth or more and one half or less the area of the space surrounded by the inner annular portion 31, the outer annular portion 32, and a pair of connecting portions 33, from the viewpoints of reducing the passage resistance and obtaining the stirring effect. As used herein, the "area" refers to the area of the first opening 41 or the above-mentioned space as viewed in the axial direction. More preferably, the area of the first opening 41 is one fifth or more and one third or less the area of the above-mentioned space.

As for the relationship between the first opening 41 and the second opening 42, it is preferable that the distance from the shield plate 34 to the outer annular portion 32 be greater than the distance from the inner annular portion 31 to the shield plate 34.

Specifically, it is preferable that the distance from the inner annular portion 31 to the shield plate 34 be one seventieth or more and one twentieth or less the maximum radius of the outer peripheral face of the outer annular portion 32. For example, the distance from the inner annular portion 31 to the shield plate 34 may be 2 mm or more for the purpose of preventing the accumulation of the liquid in the central region and for the reason that large substances such as dust are more likely to clog if the distance is too small. The distance from the inner annular portion 31 to the shield plate 34 may be 5 mm or less so that more feed liquid can pass through the first opening 41.

Preferably, the inner edge of each shield plate 34 is slightly spaced from the first end face 3a toward the second end face 3b in the axial direction in order to prevent the inner edges of the shield plates 34 from contacting each other when the separation membrane elements 2 are coupled together.

In the end member 3A of the present embodiment described above, the feed liquid fed to the separation membrane element 2 is blocked by the shield plates 34 of the upstream-side end member 3A. Therefore, as shown by arrows A in FIG. 4, the feed liquid passes through the first opening 41 between the shield plate 34 and the outer annular portion 32 and comes behind the shield plate 34. That is, the shield plate 34 converts the axial flow of the feed liquid into a radially outwardly spreading flow. As a result, the suspended solids in the feed liquid can be effectively directed toward the peripheral region, and thereby the deposition of the suspended solids can be prevented from being concentrated in a specific region. In addition, the pressure loss can be maintained constant in the separation membrane element 2.

Particularly, in the present embodiment, since the outer edge of each shield plate 34 is located closer to the second end face 3b than the inner edge thereof, the feed liquid hits the shield plate 34 and then is guided toward the first opening 41 by the shield plate 34. Therefore, most of the feed liquid can be smoothly directed to the first opening 41.

<Modifications>

Figure 5:
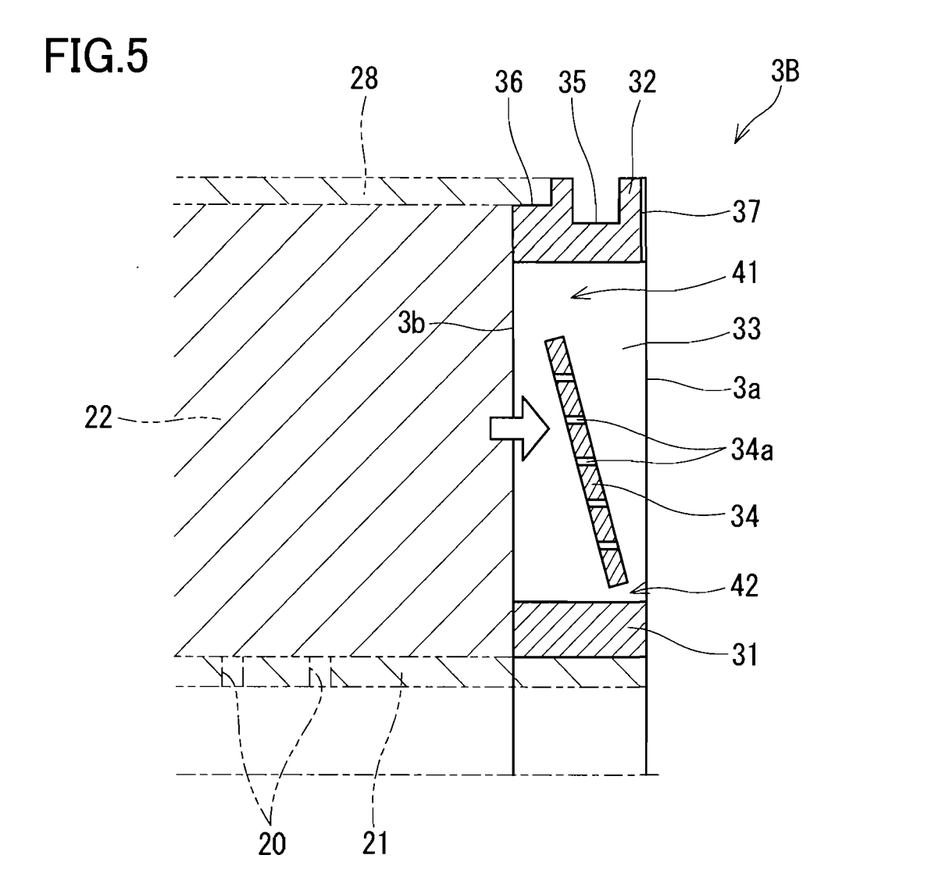
FIG. 5 is a cross-sectional view of an end member of a modification, and is also a diagram illustrating the flow of a concentrated liquid passing through the end member.

In the present embodiment, the shield plate 34 is a continuous plate. Therefore, in the downstream-side end member 3A, the concentrated liquid is guided toward the second opening 42 by the shield plate 34. So, from the viewpoint of reducing the concentrated liquid guided toward the second opening 42, it is preferable that the shield plate 34 have formed therein a flow path penetrating the shield plate 34 in the axial direction (thickness direction of the end member 3). For example, like an end member 3B of a modification shown in FIG. 5, the shield plate 34 may be a continuous plate having formed therein through holes 34a extending in the axial direction. Alternatively, like an end member 3C of a modification shown in FIG. 6, the shield plate 34 may be divided radially into a plurality of parts.

Figure 6:
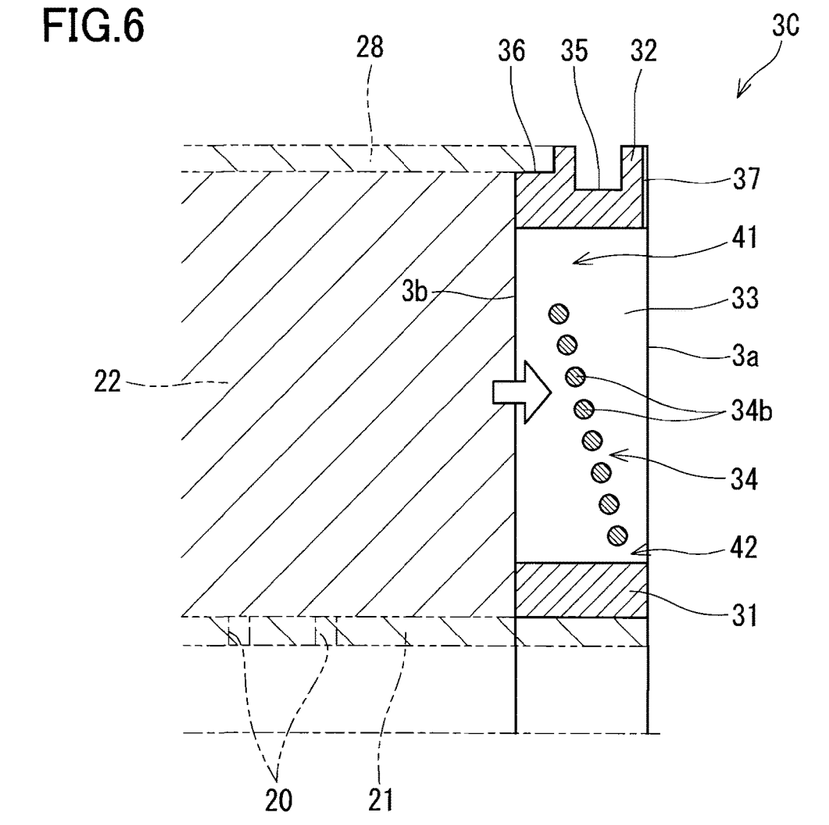
FIG. 6 is a cross-sectional view of an end member of another modification, and is also a diagram illustrating the flow of a concentrated liquid passing through the end member.

In the example shown in FIG. 6, each of the parts is a round bar 34b. In the case where the shield plate 34 is divided into a plurality of parts, it is preferable that an imaginary line connecting the centers of the parts extends from the inner edge of the shield plate 34 to the outer edge thereof at an inclination toward the second end face 3b. This configuration makes it possible to locate the outer edge of the shield plate 34 closer to the second end face 3b than the inner edge thereof, as in the embodiment described above. In addition, it is preferable that the distance from the shield plate 34 to the outer annular portion 32 be greater than the clearance between the parts (the distance between the parts that are radially spaced from each other).

The second opening 42 need not necessarily be formed between the shield plate 34 and the inner annular portion 31, and the inner edge of the shield plate 34 may be connected to the inner annular portion 31. However, when the second opening 42 is formed between the shield plate 34 and the inner annular portion 31, the accumulation of the liquid can be prevented effectively to suppress the deposition of pollutants and growth of bacteria.

In the case where rod-like spokes are used as the connecting portions 33, the adjacent shield plates 34 need not be completely separated from each other by the spokes and may be continuously connected with each other near the spokes. In other words, the connecting portions 33 may penetrate a tapered structure of shield plates 34 (a tapered, ring-shaped shield plate structure).

Second Embodiment

Figure 7:
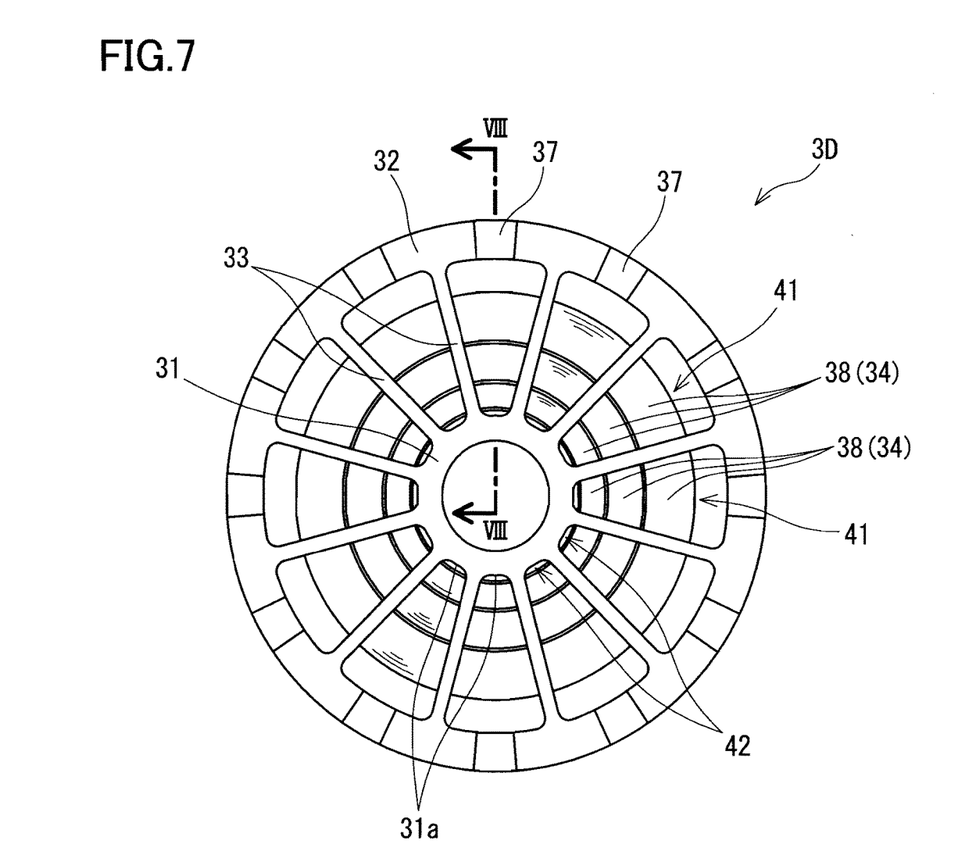
FIG. 7 is a front view of an end member for a spiral separation membrane element according to a second embodiment of the present invention.
Figure 8:
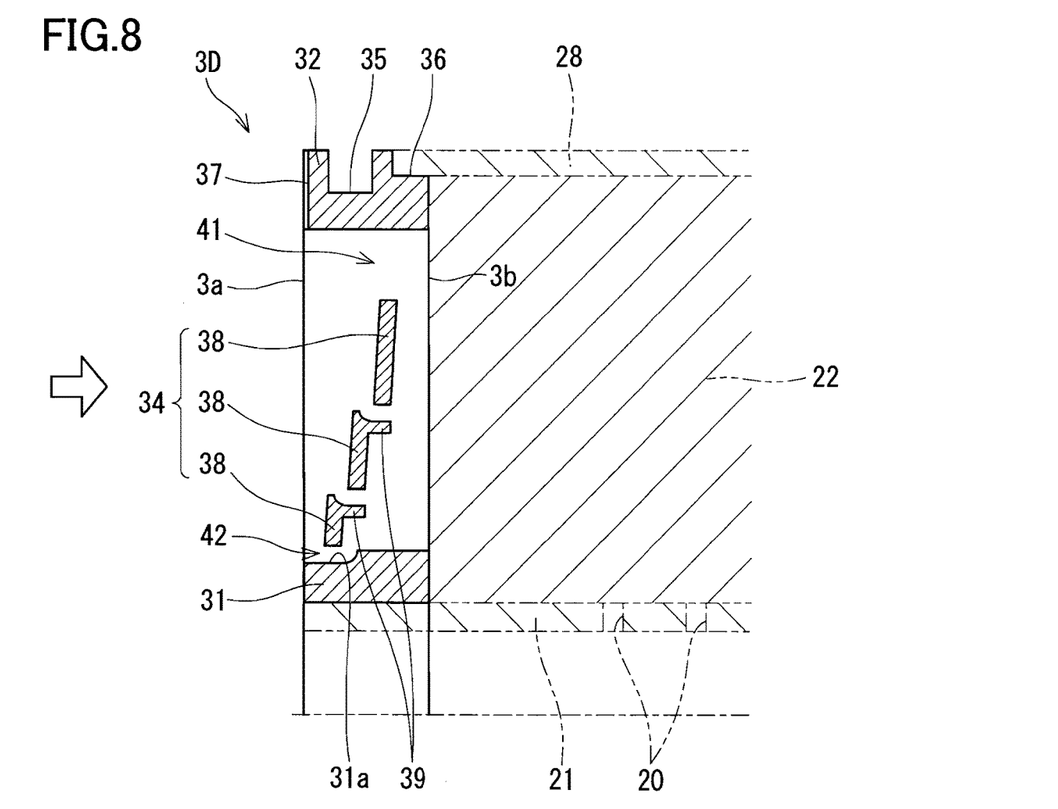
FIG. 8 is a cross-sectional view of the end member taken along the VIII-VIII line in FIG. 7, and is also a diagram illustrating the flow of a feed liquid passing through the end member.
Figure 9:
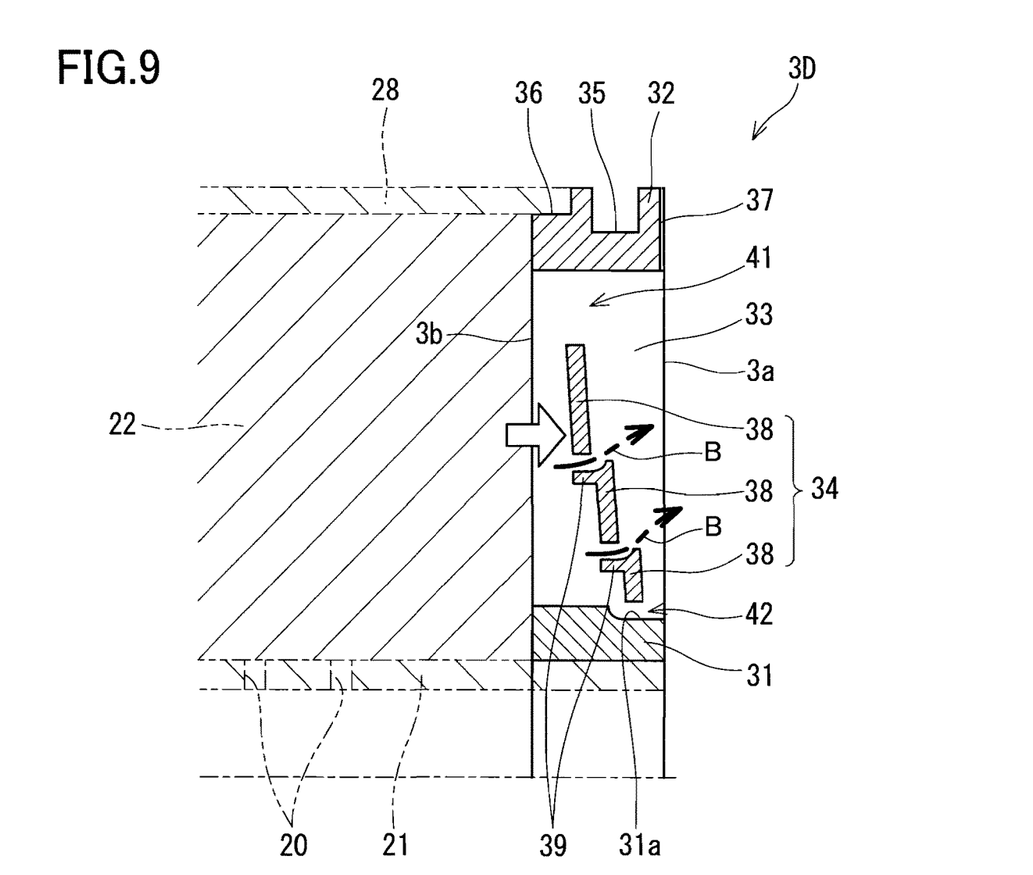
FIG. 9 is a diagram illustrating the flow of a concentrated liquid passing through the end member shown in FIG. 7.

Next, an end member 3D for a separation membrane element according to the second embodiment of the present invention will be described with reference to FIG. 7 to FIG. 9. In the present embodiment, the same components as those described in the first embodiment are denoted by the same reference numerals, and the description thereof may be omitted.

In the present embodiment, each shield plate 34 is divided radially into a plurality of parts as in the end member 3C of the modification shown in FIG. 6, and is composed of three arc-shaped plates 38. In this configuration, the shield plate 34 has formed therein flow paths penetrating the shield plate 34 in the axial direction, as in the configurations shown in FIG. 5 and FIG. 6. The number of the arc-shaped plates 38 constituting one shield plate 34 may be selected as appropriate.

The arc-shaped plates 38 are arranged in such a manner that the arc-shaped plate 38 closer to the outer annular portion 32 has a greater radial width. In the present embodiment, the arc-shaped plates 38 each extend at an inclination toward the second end face 3b from the side of the inner annular portion 31 to the side of the outer annular portion 32.

The arc-shaped plates 38 are arranged so that a gradual shift of positions of the arc-shaped plates 38 toward the second end face 3b from the side of the inner annular portion 31 to the side of the outer annular portion 32 forms a gap between each pair of the adjacent arc-shaped plates 38. Each of the two arc-shaped plates 38 except for the radially outermost arc-shaped plate 38 has a protrusion 39 protruding into the gap from the radially outer end of the arc-shaped plate 38 toward the second end face 3b.

In addition, in the present embodiment, a cutout portions 31a is provided between each pair of the connecting portions 33 on the outer peripheral face of the inner annular portion 31. Each of the cutout portion 31a opens radially outwardly and in a direction from the second end face 3b to the first end face 3a, and does not open in a direction from the first end face 3a to the second end face 3b.

More specifically, the cutout portion 31a is a recess formed continuously with the adjacent connecting portions 33, and extends from the front-side end face of the inner annular portion 31 serving as the first end face 3a toward the second end face 3b beyond the inner edge of the shield plate 34 (the radially innermost edge of the radially innermost arc-shaped plate 38). Thereby, a larger second opening 42 is provided between the shield plate 34 and the inner annular portion 31. That is, the cutout portion 31a constitutes at least a part of the second opening 42 formed between the shield plate 34 and the inner annular portion 31. When the separation membrane elements 2 are coupled together, the concentrated liquid can flow into the second opening 42 of the upstream-side end member 3D smoothly from the second opening 42 of the downstream-side end member 3D.

Preferably, the rear-side end of the cutout portion 31a at the position beyond the inner edge of the shield plate 34 is curved and raised to maintain the cross-sectional area of the flow path constant between the shield plate 34 and the inner edge. In this configuration, the liquid leaving the cutout portion 31 flows obliquely outward, and this oblique flow can increase the stirring effect.

In the upstream-side end member 3D having the configuration described above, the same effect as in the first embodiment can be obtained. On the other hand, in the downstream-side end member 3D, the flow of the concentrated liquid along the shield plate 34 is blocked by the protrusions 39. Therefore, as shown in arrows B in FIG. 9, the concentrated liquid smoothly passes through the flow paths between the arc-shaped plates 38. Furthermore, in the case where the downstream-side end member 3D and the upstream-side end member 3D are adjacent to each other, the concentrated liquid passing through the flow paths between the arc-shaped plates 38 of the downstream-side end member 3D flows radially outwardly as shown in FIG. 9. Therefore, the concentrated liquid easily flows toward the first opening 41 of the adjacent upstream-side end member 3D.

<Modifications>

The cutout portion 31a provided on the outer peripheral face of the inner annular portion 31 may be adopted in the first embodiment. Since the cutout portion 31a substantially serves as an opening even in the case where the second opening 42 is not formed between the shield plate 34 and the inner annular portion 31, it is useful in forming an oblique flow and increase the stirring effect.

The arc-shaped plates 38 need not necessarily be arranged in such a manner that the arc-shaped plate 38 closer to the outer annular portion 32 has a greater radial width, and all the arc-shaped plates 38 may have the same radial width. However, it is preferable that the arc-shaped plate 38 be arranged in such a manner that the arc-shaped plate 38 closer to the central region has a smaller width, as in the embodiment described above. Since the concentrated liquid is more likely to accumulate in the central region, the smaller width arc-shaped plate 38 placed in the central region increases the effect of stirring and mixing the concentrated liquid.

The arc-shaped plates 38 need not necessarily be arranged so that a gap is formed between adjacent arc-shaped plates 38, and they may be aligned with each other. In the case where a gap is formed between the adjacent arc-shaped plates 38, it is preferable that at least one of the arc-shaped plates 38 be provided with the protrusion 39.

Figure 10:
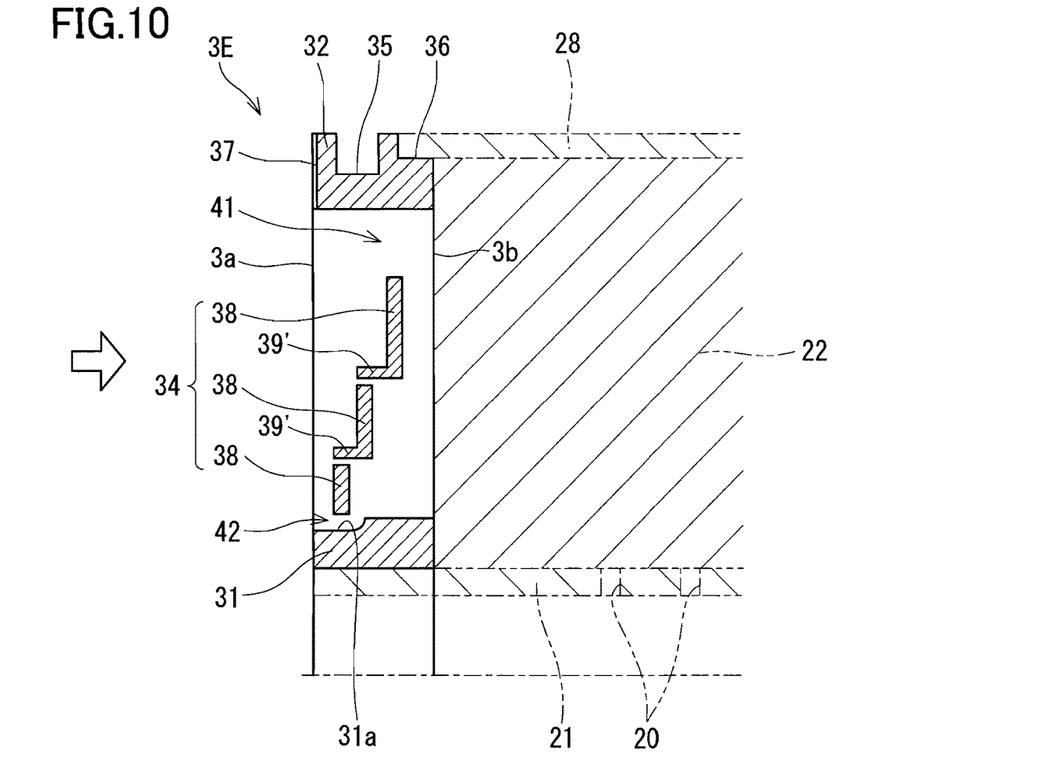
FIG. 10 is a cross-sectional view of an end member of a modification.

Furthermore, in the case where a gap is formed between the adjacent arc-shaped plates 38, it is preferable that the arc-shaped plates 38 each be inclined, but all the arc-shaped plates 38 need not extend at an inclination toward the layered body 22 from the side of the inner annular portion 31 to the side of the outer annular portion 32. For example, as in an end member 3E of a modification shown in FIG. 10, some or all of the arc-shaped plates 38 may extend perpendicular to the axial direction of the inner annular portion 31 and the outer annular portion 32. Furthermore, in that case, each of the arc-shaped plates 38 except for the radially innermost arc-shaped plate 38 may have a protrusion 39' protruding into the gap from the radially inner end of the arc-shaped plate 38 toward the first end face 3a. In the case where all the arc-shaped plates 38 extend perpendicular to the axial direction, the positions of the arc-shaped plates 38 can be gradually and radially outwardly shifted toward the layered body 22. Thereby, a gap can be formed between the adjacent arc-shaped plates 38, and at the same time, the outer edge of the shield plate 34 can be located closer to the second end face 3b than the inner edge thereof.

Other Embodiments

In the first and second embodiments, the shield plate 34 is disposed between each pair of the coupling portions 33. However, the shield plate 34 only needs to be disposed between at least one pair of the connecting portions 33.

A plurality of separation membrane elements 2 need not necessarily be loaded in the pressure container 7. One separation membrane element 2 may be loaded therein.

Furthermore, in the separation membrane element 2, it is preferable that at least the upstream-side end member be the end member 3 having the shield plate 34. The downstream-side end member need not necessarily be the end member 3 having the shield plate 34.

DESCRIPTION OF THE REFERENCE NUMERALS

1 Separation membrane module
2 Spiral separation membrane element
20 Through hole
21 Central tube
23 Separation membrane
24, 25 Flow path materials
3A to 3E End members for spiral separation membrane elements
3a First end face
3b Second end face
31 Inner annular portion
31a Cutout portion
32 Outer annular portion
33 Connecting portion
34 Shield plate
34b Round bar (part)
38 Arc-shaped plate (part)
39 Protrusion
41, 42 Openings
7 Pressure container

The invention claimed is:

1. An end member for a spiral separation membrane element, the end member comprising:
an inner annular portion;
an outer annular portion surrounding the inner annular portion at a distance from the inner annular portion;
a plurality of connecting portions connecting the inner annular portion and the outer annular portion; and
a plurality of shield plates, each of the plurality of shield plates being in contact with adjacent connecting portions of the plurality of connecting portions and forming an opening between each of the plurality of shield plates and the outer annular portion, the plurality of shield plates connecting the plurality of connecting portions to form an annular array,
wherein the end member includes a first end face forming an end face of the spiral separation membrane element and a second end face opposite to the first end face, and
an entire outer edge of each of the plurality of shield plates on a side of the outer annular portion is located closer to the second end face than an entire inner edge of each of the plurality of shield plates on a side of the inner annular portion.

2. The end member for a spiral separation membrane element according to claim 1, wherein each of the plurality of shield plates is a plate extending continuously from the inner edge to the outer edge at an inclination toward the second end face.

3. The end member for a spiral separation membrane element according to claim 1, wherein
each of the plurality of shield plates is divided radially into a plurality of parts, and
an imaginary line connecting centers of the plurality of parts extends from the inner edge to the outer edge at an inclination toward the second end face.

4. The end member for a spiral separation membrane element according to claim 3, wherein a distance between each of the plurality of shield plates and the outer annular portion is greater than a clearance between the plurality of parts.

5. The end member for a spiral separation membrane element according to claim 1, wherein an area of the opening is one tenth or more and one half or less an area of a space surrounded by the inner annular portion, the outer annular portion, and a pair of the connecting portions.

6. The end member for a spiral separation membrane element according to claim 1, wherein each of the plurality of shield plates forms an opening between each of the plurality of shield plates and the inner annular portion.

7. The end member for a spiral membrane element according to claim 6, wherein a distance between a respective shield plate among the plurality of shield plates and the outer annular portion is greater than a distance between the inner annular portion and the shield plate.

8. The end member for a spiral separation membrane element according to claim 6, wherein a distance between the inner annular portion and a respective shield plate among the plurality of shield plates is one seventieth or more and one twentieth or less a maximum radius of an outer peripheral face of the outer annular portion.

9. The end member for a spiral separation membrane element according to claim 1, wherein
a cutout portion opening radially outwardly and in a direction from the second end face to the first end face is provided on an outer peripheral face of the inner annular portion.

10. The end member for a spiral membrane element according to claim 9, wherein the cutout portion extends from an end face of the inner annular portion serving as the first end face toward the second end face beyond an inner edge of each of the plurality of shield plates on a side of the inner annular portion so that the cutout portion forms at least a part of an opening formed between each of the plurality of shield plates and the inner annular portion.

11. The end member for a spiral separation membrane element according to claim 3, wherein each of the plurality of parts is an arc-shaped plate.

12. The end member for a spiral separation membrane element according to claim 11, wherein the arc-shaped plates are arranged so that a gradual shift of positions of the arc-shaped plates toward the second end face from the side of the inner annular portion to the side of the outer annular portion forms a gap between each pair of the adjacent arc-shaped plates.

13. The end member for a spiral separation membrane element according to claim 12, wherein at least one of the arc-shaped plates has a protrusion protruding into the gap from a radially outer end of the arc-shaped plate toward the second end face.

14. The end member for a spiral separation membrane element according to claim 11, wherein the arc-shaped plates are arranged in such a manner that the arc-shaped plate closer to the outer annular portion has a greater radial width.

15. The end member for a spiral separation membrane element according to claim 1, wherein each of the plurality of shield plates is disposed between adjacent ones of the plurality of connecting portions.

16. A spiral separation membrane element comprising at least one end member according to claim 1.

17. A separation membrane module comprising: a tubular pressure container; and
the spiral separation membrane element according to claim 16, the spiral separation membrane element being loaded in the pressure container.

18. The separation membrane module according to claim 17, wherein at least an upstream-side end member in the spiral separation membrane element includes:
an inner annular portion,
an outer annular portion surrounding the inner annular portion at a distance from the inner annular portion,
a plurality of connecting portions connecting the inner annular portion and the outer annular portion, and
a plurality of shield plates, each of the plurality of shield plates being in contact with the adjacent connecting portions and forming an opening between the shield plate and the outer annular portion,
the plurality of shield plates connects the plurality of connecting portions to form an annular array,
the upstream-side end member includes a first end face forming an end face of the spiral separation membrane element and a second end face opposite to the first end face, and
an entire outer edge of each of the plurality of shield plates on a side of the outer annular portion is located closer to the second end face than an entire inner edge of each of the plurality of shield plates on a side of the inner annular portion.

19. The end member for a spiral separation membrane element according to claim 1, wherein the plurality of shield plates converts an axial flow of liquid into a radially outward flow.

* * * * *